June 30, 1953  J. LEON  2,643,727

SOUND TRANSMITTING DEVICE WITH AN ELLIPSOIDAL REFLECTOR

Filed May 20, 1950

INVENTOR.
JOSEPH LEON
BY
Haseltine, Lake & Co.
AGENTS

Patented June 30, 1953

2,643,727

UNITED STATES PATENT OFFICE 2,643,727

SOUND TRANSMITTING DEVICE WITH AN ELLIPSOIDAL REFLECTOR

Joseph Léon, Choisy-le-Roi, France, assignor, by mesne assignments, to "Elipson" S. A., Paris, France, a society of France Application May 20, 1950, Serial No. 163,241
In France January 31, 1950

3 Claims. (Cl. 181—31)

The present invention relates to sound transmitting devices and it is more especially concerned with devices for radiating the sound produced by an artificial source of sound such as the vibrating diaphragm of a loud speaker.

Its object is to provide a device of this kind which is better adapted than those used up to the present time to meet the various requirements of practice, in particular to obtain a sound radiation which is pure, undistorted, uniformly distributed and gives an impression of volume.

My invention consists chiefly in providing the transmitting device with a sound reflector arranged in such manner that its reflecting surface causes at least a portion of the sound energy from the source to converge toward a focus located on the outside of the reflector.

According to a particularly advantageous embodiment of my invention, this reflecting surface has the shape of a portion of an ellipsoid of revolution at one focus of which is located the source of sound of the transmitting device, whereas the other focus, toward which converge the reflected sounds, is located beyond the outlet aperture of the reflector.

Preferred embodiments of my invention will be hereinafter described with reference to the accompanying drawings, given merely by way of example and in which:

Fig. 1 diagrammatically shows, in perspective view, a sound transmitting device according to my invention;

My sound transmitting device includes a diaphragm 1 having for instance the shape of a cone, or a portion of a cone, mounted in a support 2 for instance of cylindrical shape, this diaphragm being energized through any suitable means.

Across the path of travel of at least a portion of the sound waves transmitted from this diaphragm 1 provide a sound reflector 3.

It has already been proposed to make use, in sound transmitting devices, of paraboloidal reflectors.

In opposition with these known devices, the inner surface 3a of my reflector is arranged to cause the reflected sound to converge toward a point (or a region of restricted volume) which constitutes a focus located on the outside of the reflector.

Figure 2:
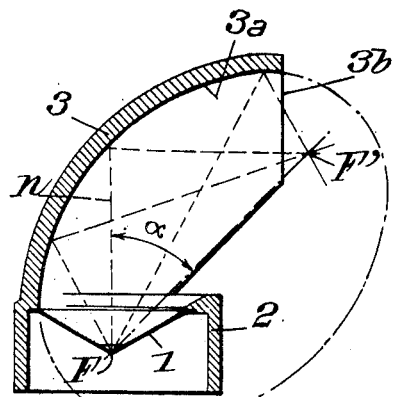
Fig. 2 is an axial section thereof.

For this purpose, surface 3a is preferably given the shape of a portion of an ellipsoid of revolution the outline of which is shown on Fig. 2 in dot-and-dash lines and I locate the center of the source of sound (in this case the apex of the cone formed by diaphragm 1) at one focus, designated by F of the ellipsoid.

The waves reflected by surface 3a are concentrated at the other focus F' of this ellipsoid.

The outlet aperture is located between focus F and the second focus F' of the ellipsoid, for instance in plane 3b (Fig. 2), whereby this second focus F' is located on the outside of the reflector.

Preferably diaphragm 1 is so disposed with respect to the axis F—F' of the ellipsoid that the normal $n$ to the general plane of the diaphragm passing through the center thereof is directed toward the reflecting surface and makes with said axis an acute angle $a$. The plane of aperture 3b is then generally inclined on axis F—F' so as to be, for instance, at 90° to the general plane of diaphragm 1, which plane is defined, in the case of a conical diaphragm, by the base of the cone formed by this diaphragm. The sound beam undergoes in the example shown a reflection of 90°.

Figure 1:
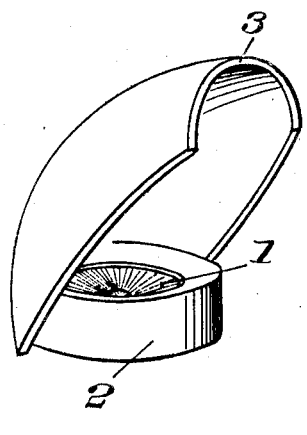

The reflecting surface consists of a portion of the ellipsoid located opposite diaphragm 1. Thus, the reflector shown by Figs. 1 and 2 is constituted by an ellipsoid portion the base of which is located in the plane passing through axis F—F' and perpendicular to the plane defined by this axis and the axis $n$ of the diaphragm.

Figure 3:
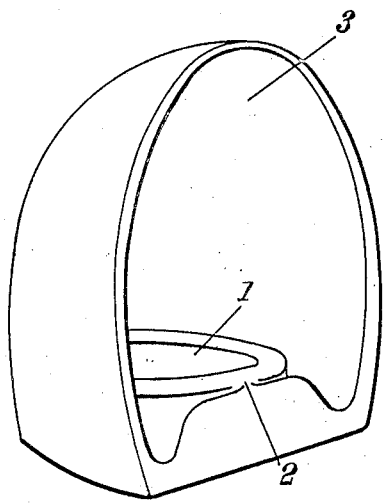
Figs. 3 and 4 are views similar to Figs. 1 and 2 respectively and relative to another embodiment of my invention.
Figure 4:
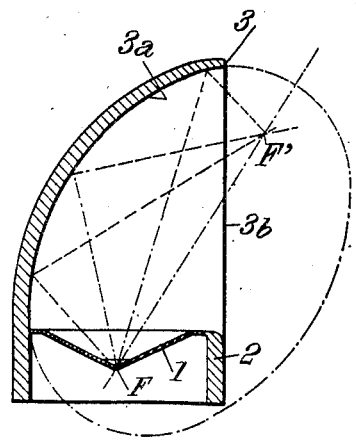

In the embodiment of Figs. 3 and 4 the portion of the ellipsoid which constitutes the reflecting surface is limited by the plane of the base of the conical diaphragm and plane 3b at right angles thereto.

Of course the invention is in no way limited to these particular forms of reflectors, which are given merely by way of indication.

Whatever be the embodiment of my invention that is adopted, I always obtain a sound transmitting device which achieves a sound concentration at a virtual point (or in a small region of space) located on the outside of the reflector and which, subjectively, i. e. for the listener, is substituted for the real source of sound.

It was found that this arrangement gives a sound radiation which is pure, undistorted, uniformly distributed in practically the whole of the space located in front of the aperture 3b of the reflector and gives an impression of volume, provided that the reflector is made of any suitable material which is sufficiently reflecting.

In some applications, it may be of interest to make use of several transmitter devices such as above described disposed in such manner that the points of concentration thereof coincide.

When one or several devices made according to my invention are used for transmitting sound from a sound film, it may be advantageous to locate the sound concentration point immediately ahead of the screen on which the film pictures are seen.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A sound transmitting device which comprises, in combination, a loud speaker diaphragm and a concave sound reflector in the form of a portion of an ellipsoid having one focus located at the center of said diaphragm, said ellipsoid portion being limited by a plane at right angles to the general plane of said diaphragm and which intersects the ellipsoid axis between said focus and the other one, whereby the second focus is located on the outside of said reflector, the line extending from the center of said diaphragm at right angles to the general plane thereof toward said sound reflector making with the line extending from said diaphragm center toward the other focus an acute angle such that said other focus is located at a short distance ahead of the surface which limits the ellipsoidal surface of the sound reflector.

2. A sound transmitting device which comprises, in combination, a loud speaker diaphragm and a concave sound reflector in the form of a portion of an ellipsoid having one focus located at the center of said diaphragm, said ellipsoid portion being limited by a surface intersecting the ellipsoid axis between said focus and the other one, so that this second focus is on the outside of said reflector, and this surface being such that said ellipsoid portion is intersected by all the generatices of a cylinder having as its base the outline of said diaphragm and the generatrices of which are at right angles to the general plane of said diaphragm, the line extending from the center of said diaphragm at right angles to the general plane thereof toward said sound reflector making with the line extending from said diaphragm center toward the other focus an acute angle such that said other focus is located at a short distance ahead of the surface which limits the ellipsoidal surface of the sound reflector.

3. A device according to claim 2 for transmitting sounds to persons located in front thereof, in which said second focus is so positioned as to be always located between the reflector and said persons.

JOSEPH LÉON.

References Cited in the file of this patent

UNITED STATES PATENTS

| Number | Name | Date |
|---|---|---|
| 1,619,981 | Knut | Mar. 8, 1927 |
| 1,786,279 | Wolff | Dec. 23, 1930 |
| 1,936,396 | Jefferis | Nov. 21, 1933 |

FOREIGN PATENTS

| Number | Country | Date |
|---|---|---|
| 41,374 | France | Jan. 7, 1933 |
| 310,094 | Italy | July 27, 1933 |